US009727949B1

(12) United States Patent
Miller

(10) Patent No.: US 9,727,949 B1
(45) Date of Patent: Aug. 8, 2017

(54) PROVIDING SECURE DIGITAL IMAGES

(71) Applicant: Google Inc., Mountain View, CA (US)

(72) Inventor: Nolan Andrew Miller, Krikland, WA (US)

(73) Assignee: Google Inc., Mountain View, CA (US)

( * ) Notice: Subject to any disclaimer, the term of this patent is extended or adjusted under 35 U.S.C. 154(b) by 87 days.

(21) Appl. No.: 14/547,137

(22) Filed: Nov. 19, 2014

(51) Int. Cl.
*G09G 5/00* (2006.01)
*G06T 3/40* (2006.01)
*G06T 11/60* (2006.01)

(52) U.S. Cl.
CPC ............ *G06T 3/4038* (2013.01); *G06T 11/60* (2013.01); *G06T 2210/32* (2013.01)

(58) Field of Classification Search
None
See application file for complete search history.

(56) References Cited

U.S. PATENT DOCUMENTS 7,669,051 B2 2/2010 Redlich et al.
7,958,268 B2 6/2011 Redlich et al.
8,284,999 B2 10/2012 Kurzweil et al.
8,677,505 B2 3/2014 Redlich et al.
2008/0284763 A1* 11/2008 Someya ................ G09G 3/001 345/204
2008/0297455 A1* 12/2008 Endo .................... G09G 3/2022 345/87
2009/0115719 A1* 5/2009 Lin ...................... G09G 3/3426 345/102
2009/0225183 A1* 9/2009 Tamura ..................... G06T 5/50 348/222.1
2010/0142819 A1* 6/2010 Suzuki ................... G06K 9/522 382/173
2013/0021369 A1* 1/2013 Denney ............. H04N 21/4126 345/620
2013/0109915 A1* 5/2013 Krupnik ................ G06T 3/4038 600/109
2013/0229553 A1* 9/2013 Suzuki ................... H04N 5/335 348/296
2014/0132789 A1* 5/2014 Koyama ................. G06T 13/80 348/218.1
2014/0192076 A1* 7/2014 Tan ...................... H04N 9/3147 345/582
2014/0218403 A1* 8/2014 Belkoura ................ G06T 11/60 345/635
2014/0219582 A1* 8/2014 Huang ................. G11B 27/034 382/284
2014/0320534 A1* 10/2014 Kimura ................... G06T 11/60 345/634
2015/0116361 A1* 4/2015 Braun ..................... G06T 11/60 345/634
2015/0154786 A1* 6/2015 Furukawa ............. H04N 7/181 345/419
2015/0206282 A1* 7/2015 Kudo ........................ G06T 3/00 348/239

(Continued)

*Primary Examiner* — Ryan R Yang
(74) *Attorney, Agent, or Firm* — IP Spring

(57) ABSTRACT

Implementations generally relate to providing secure digital images. In some implementations, a method includes receiving an input image. The method further includes generating a plurality of partial images derived from the input image. The method further includes displaying the plurality of partial images to a user, where a sum of the partial images provides the input image.

19 Claims, 9 Drawing Sheets

(56) References Cited

U.S. PATENT DOCUMENTS

| | | | | |
|---|---|---|---|---|
| 2015/0254807 | A1* | 9/2015 | Citrin | G06T 3/4038 382/284 |
| 2015/0281575 | A1* | 10/2015 | Yamada | H04N 5/23238 348/36 |
| 2016/0065785 | A1* | 3/2016 | Tang | G06T 3/4038 382/284 |
| 2016/0098101 | A1* | 4/2016 | Park | G06F 3/0346 345/634 |

* cited by examiner

Figure 4:
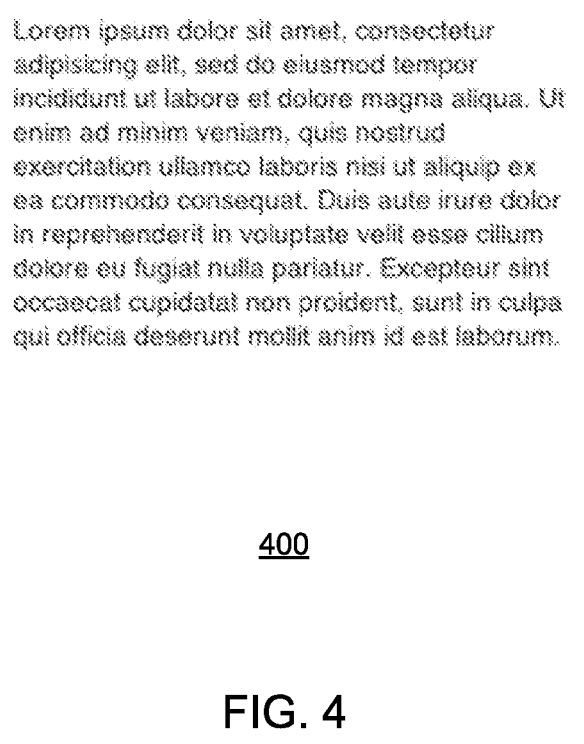

Lorem ipsum dolor sit amet, consectetur adipisicing elit, sed do eiusmod tempor incididunt ut labore et dolore magna aliqua. Ut enim ad minim veniam, quis nostrud exercitation ullamco laboris nisi ut aliquip ex ea commodo consequat. Duis aute irure dolor in reprehenderit in voluptate velit esse cillum dolore eu fugiat nulla pariatur. Excepteur sint occaecat cupidatat non proident, sunt in culpa qui officia deserunt mollit anim id est laborum.

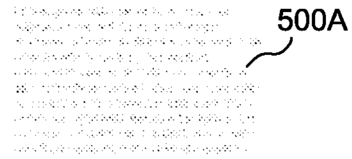
FIG. 5A
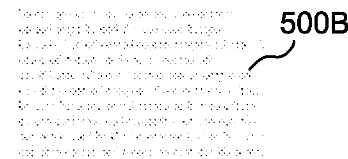
FIG. 5B
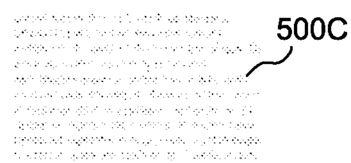
FIG. 5C
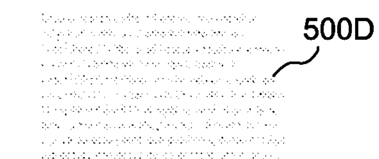
FIG. 5D
500E
FIG. 5E here is some test text that I w

PROVIDING SECURE DIGITAL IMAGES

BACKGROUND

Social network systems often enable users to upload media content such as images and text. Social network systems also enable users to share such media with each other. For example, users can share media with friends and family. In an increasingly digital era, the permanence of information presents a number of privacy concerns. Technologies exist that prevent computer duplication.

SUMMARY

Implementations generally relate to providing secure digital images. In some implementations, a method includes receiving an input image. The method further includes generating a plurality of partial images derived from the input image. The method further includes displaying the plurality of partial images to a user, where a sum of the partial images provides the input image.

With further regard to the method, in some implementations, the generating of the plurality of images is based in part on a randomization algorithm. In some implementations, the generating of the plurality of images is based in part on a plurality of noise images. In some implementations, the generating of the plurality of partial images is based on a spatial separation of the input image. In some implementations, the generating of the plurality of partial images includes performing a frequency domain partition of the input image. In some implementations, the displaying of the plurality of partial images includes displaying the partial images sequentially. In some implementations, the displaying of the plurality of partial images includes displaying the partial images over a predetermined time period.

In some implementations, a non-transitory computer-readable storage medium carries program instructions thereon, where the instructions when executed by one or more processors cause the one or more processors to perform operations including: receiving an input image, generating a plurality of partial images derived from the input image, displaying the plurality of partial images to a user, where a sum of the partial images provides the input image.

With further regard to the computer-readable storage medium, in some implementations, the generating of the plurality of images is based in part on a randomization algorithm. In some implementations, the generating of the plurality of images is based in part on a plurality of noise images. In some implementations, the instructions further cause the one or more processors to perform operations including generating the plurality of partial images based on a spatial separation of the input image. In some implementations, to generate the plurality of partial images, the instructions further cause the one or more processors to perform operations including performing a frequency domain partition of the input image. In some implementations, to display the plurality of partial images, the instructions further cause the one or more processors to perform operations including displaying the partial images sequentially. In some implementations, to display the plurality of partial images, the instructions further cause the one or more processors to perform operations including displaying the partial images over a predetermined time period.

In some implementations, a system includes one or more processors, and logic encoded in one or more tangible media for execution by the one or more processors. When executed, the logic is operable to perform operations including: receiving an input image, generating a plurality of partial images derived from the input image, and displaying the plurality of partial images to a user, where a sum of the partial images provides the input image.

With further regard to the system, in some implementations, the generating of the plurality of images is based in part on a randomization algorithm. In some implementations, the generating of the plurality of images is based in part on a plurality of noise images. In some implementations, the logic when executed is further operable to perform operations including generating the plurality of partial images based on a spatial separation of the input image. In some implementations, to generate the plurality of partial images, the logic when executed is further operable to perform operations including performing a frequency domain partition of the input image. In some implementations, to display the plurality of partial images, the logic when executed is further operable to perform operations including displaying the partial images sequentially.

BRIEF DESCRIPTION OF THE DRAWINGS

FIG. 4 illustrates an example input image, according to some implementations.

FIGS. 5A to 5E illustrate example noise images, according to some implementations.

FIG. 6 illustrates another example partial image 600, according to some implementations.

FIG. 7 illustrates another example partial image 700, according to some implementations.

DETAILED DESCRIPTION

Implementations described herein provide secure images. In various implementations, a system receives an input image. For example, an input image may be text or a photo, etc. The system then generates partial images derived from the input image. The system then displays the partial images to a user, where the sum of the partial images that when perceived by the human visual cortex appears to provide the input image. As described in more detail below, the system displays the partial images separately and in sequence. The system displays the sequence of partial images over a short time period and quickly enough such that the user perceives an image in a manner that closely resembles the original input image.

Figure 1:
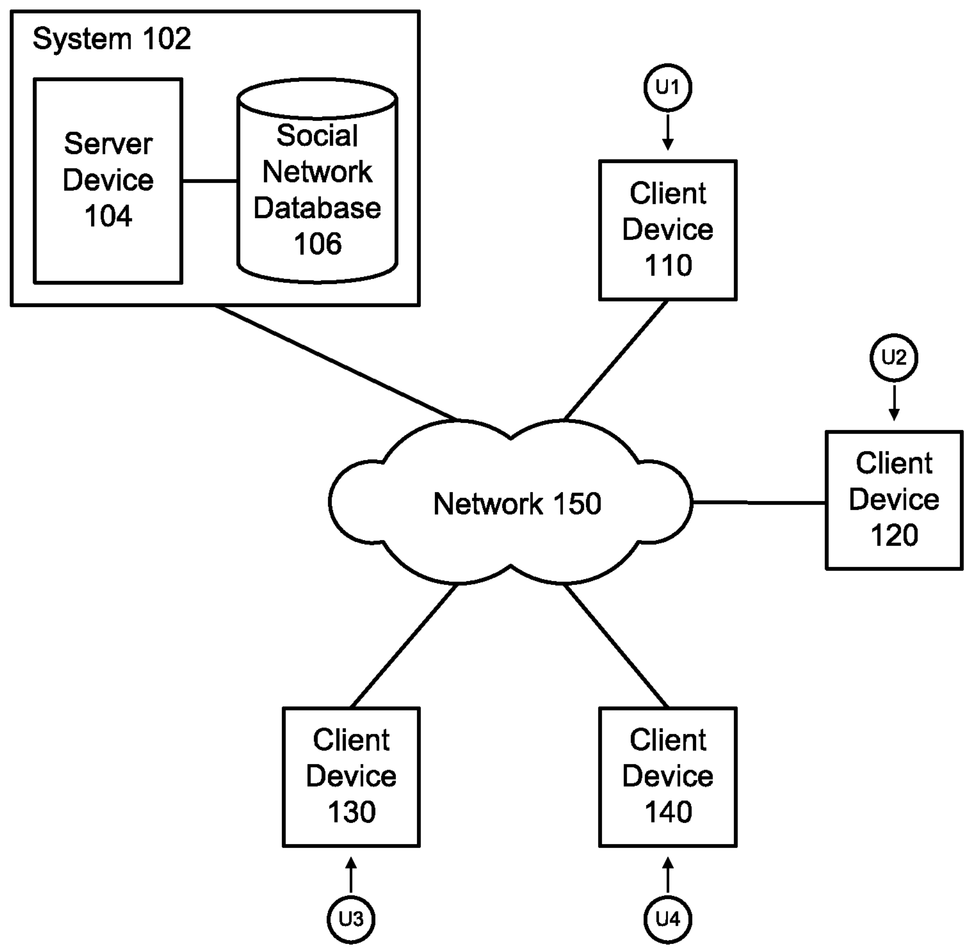
FIG. 1 illustrates a block diagram of an example network environment, which may be used to implement the implementations described herein.

FIG. 1 illustrates a block diagram of an example network environment 100, which may be used to implement the implementations described herein. In some implementations, network environment 100 includes a system 102, which includes a server device 104 and a social network database 106. In various implementations, the term system 102 and phrase "social network system" may be used interchangeably. Network environment 100 also includes client devices 110, 120, 130, and 140, which may communicate with each other via system 102. Network environment 100 also includes a network 150.

For ease of illustration, FIG. 1 shows one block for each of system 102, server device 104, and social network database 106, and shows four blocks for client devices 110, 120, 130, and 140. Blocks 102, 104, and 106 may represent multiple systems, server devices, and social network databases. Also, there may be any number of client devices. In other implementations, network environment 100 may not have all of the components shown and/or may have other elements including other types of elements instead of, or in addition to, those shown herein.

In various implementations, users U1, U2, U3, and U4 may communicate with each other using respective client devices 110, 120, 130, and 140. For example, users U1, U2, U3, and U4 may interact with each other, where respective client devices 110, 120, 130, and 140 transmit media content such as images to each other.

In the various implementations described herein, the processor of system 102 causes the elements described herein (e.g., images, messages, etc.) to be displayed in a user interface on one or more display screens.

While some implementations are described herein in the context of a social network system, these implementations may apply in contexts other than a social network. For example, implementations may apply locally for an individual user. For example, system 102 may perform the implementations described herein on a stand-alone computer, tablet computer, smartphone, etc.

Figure 2:
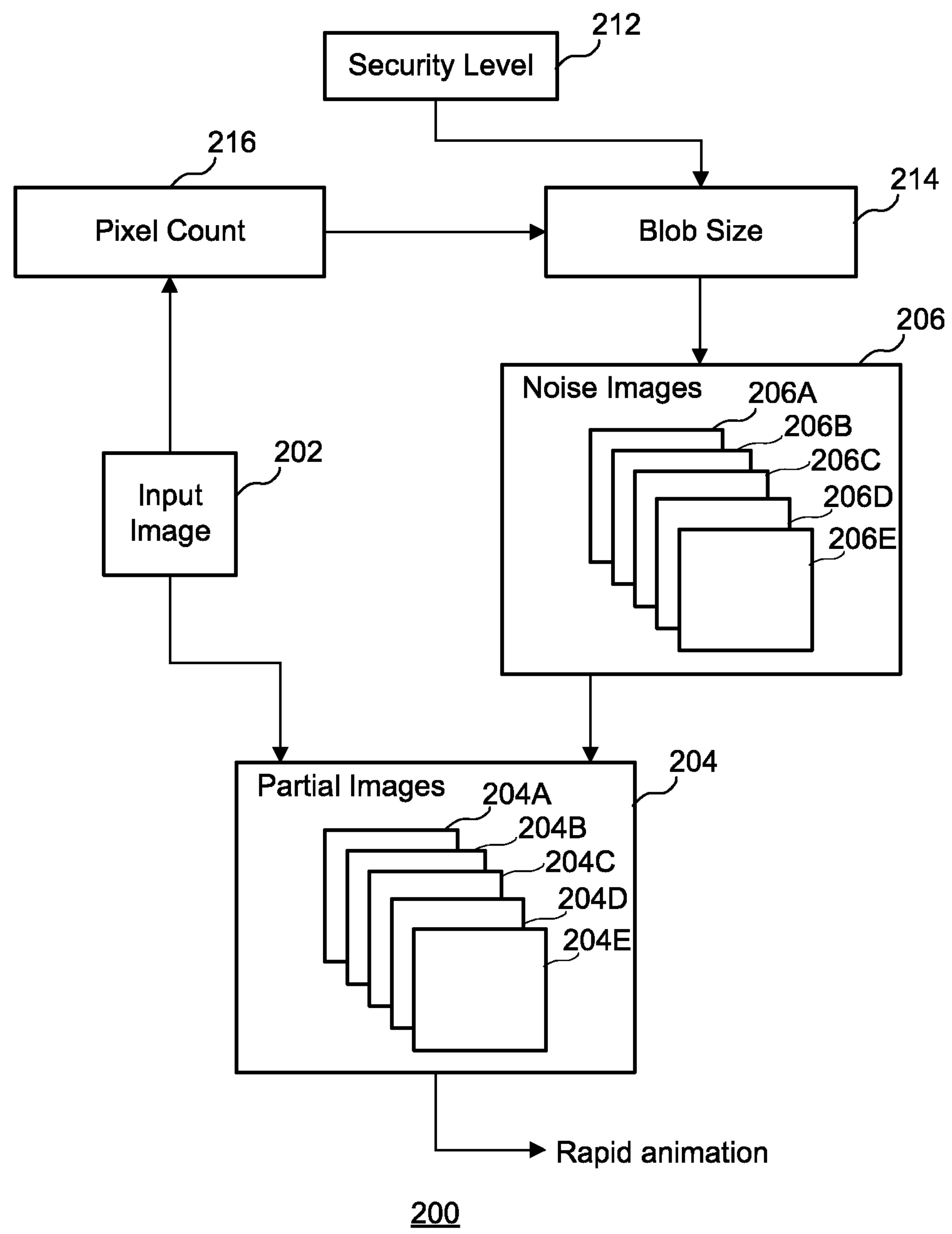
FIG. 2 illustrates an example simplified block diagram for providing secure digital images, according to some implementations.

FIG. 2 illustrates an example simplified block diagram 200 for providing secure digital images, according to some implementations. Block diagram 200 of FIG. 2 is described in more detail below in connection with FIG. 3.

Figure 3:
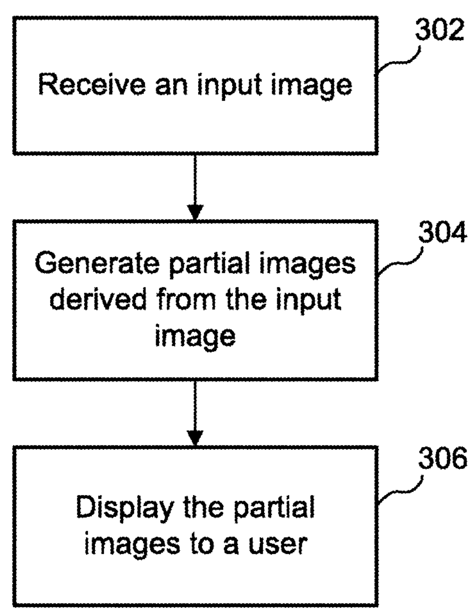
FIG. 3 illustrates an example simplified flow diagram for providing secure digital images, according to some implementations.
Figure 8A:
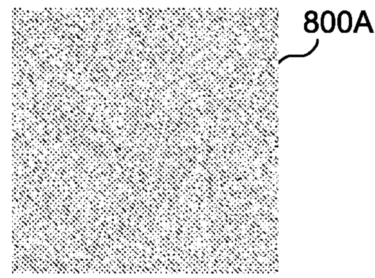
FIGS. 8A to 8E illustrate example partial images, according to some implementations.
Figure 8B:
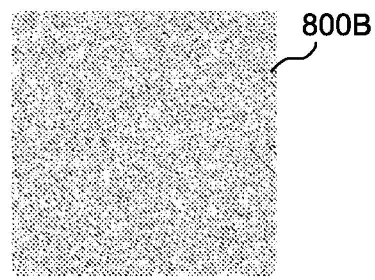
Figure 8C:
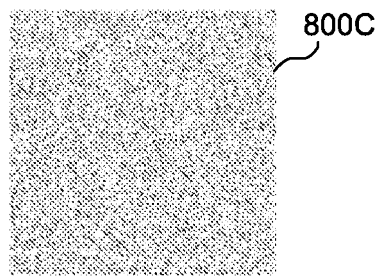
Figure 8D:
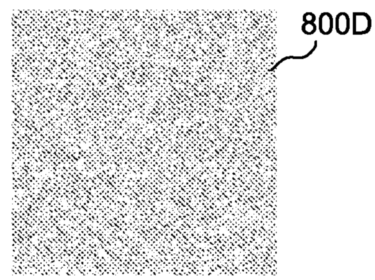
Figure 8E:
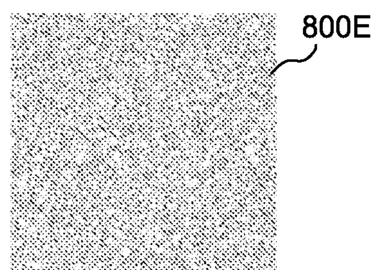

FIG. 3 illustrates an example simplified flow diagram for providing secure digital images, according to some implementations. Referring to both FIGS. 1, 2, and 3, a method is initiated in block 302, where system 102 receives an input image 202. In various implementations, system 102 receives the image from a user. In various implementations, the image may be received when the user uploads the image to system 102.

FIG. 4 illustrates an example input image 400, according to some implementations. Input image 400 may be used to represent input image 202. In this particular implementation, image 400 is text. While various implementations are described in the context of text examples, these implementations and others also apply to other types of media such as photos.

In block 304, system 102 generates partial images 204A, 204B, 204C, 204D, and 204E. As described in more detail below, system 102 derives partial images 204A, 204B, 204C, 204D, and 204E from input image 202. Partial images 204A, 204B, 204C, 204D, and 204E as a set may also be referred to as partial images 204. Various example implementations of partial images are described in more detail below.

FIGS. 5A to 5E illustrate example partial images 500A, 500B, 500C, 500D, and 500E, according to some implementations. Partial images 500A, 500B, 500C, 500D, and 500E may be used to represent partial images 204A, 204B, 204C, 204D, and 204E of FIG. 2.

In various implementations, each partial image contains a portion of the input image, where different partial images contain different portions of the input image such that no individual partial image contains a sufficient amount of information to regenerate the original input image or to identify important features of the original input image. In a more specific example, the combination of the data contained in partial images 500A, 500B, 500C, 500D, and 500E of FIG. 5 equals the data contained in input image 400 of FIG. 4. For clarification, additional implementations are described in detail below.

Figure 6:
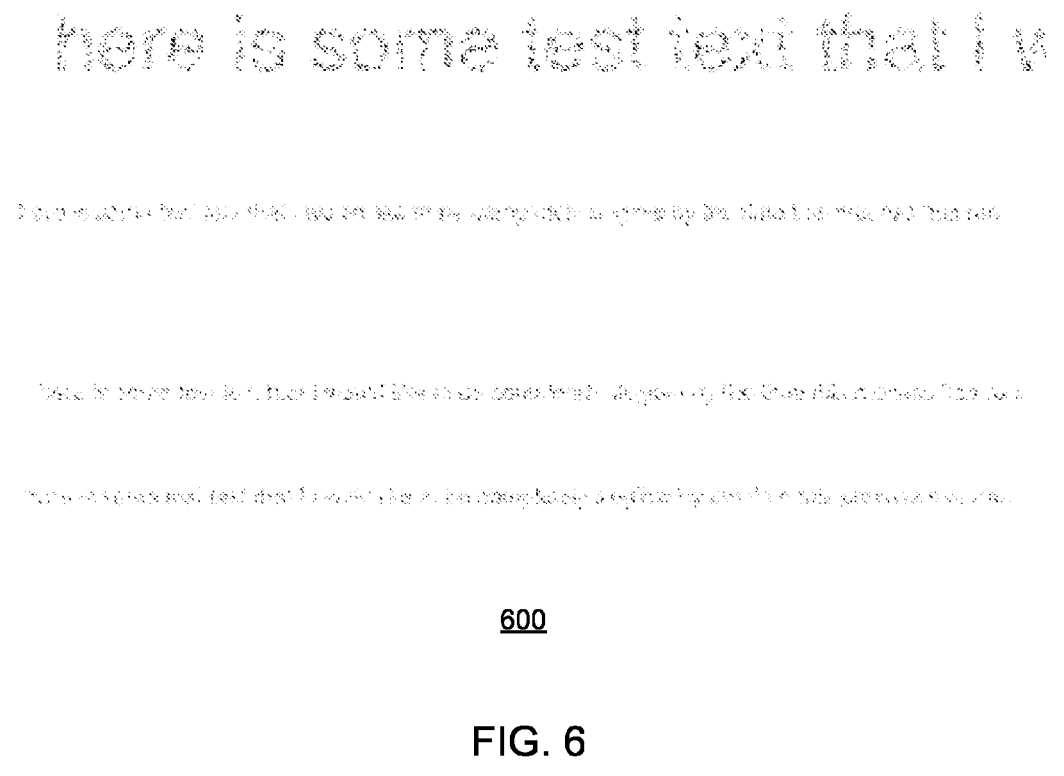

FIG. 6 illustrates another example partial image 600, according to some implementations. As shown, partial image 600 contains a portion of an input image (not shown). Specifically, some visual portions (e.g., pixels) are shown, and other visual portions are missing. The missing portions or pixels are contained in one or more other partial images (not shown), where the different partial images contain different portions of the input image. As a result, there is some meaningful information in every frame, but not enough information (e.g., to identify individuals, read text present in the image, etc.). Adding all of the partial images produces the complete input image.

As can be appreciated, system 102 separates the data/information content of the original input image across multiple frames. With this technique, a single frame does not contain enough information to extract meaningful details about the content, however, the combined image a human eye perceives is a composition of the partial frames which together form the full image.

In this particular implementation, system 102 distributes single pixels across multiple N frames. As can be appreciated, the fewer frames across which the pixels are distributed (e.g., N=2 frames) the more legible the image in each frame. Conversely, the more frames across which the pixels are distributed the more illegible the image in each frame (e.g., N=5 frames).

While this particular example implementation is described in the context of single pixels being distributed across multiple frames, implementations described herein and others also apply to groups of pixels (e.g., groups of 4 pixels, etc.) being distributed across multiple frames.

Figure 7:
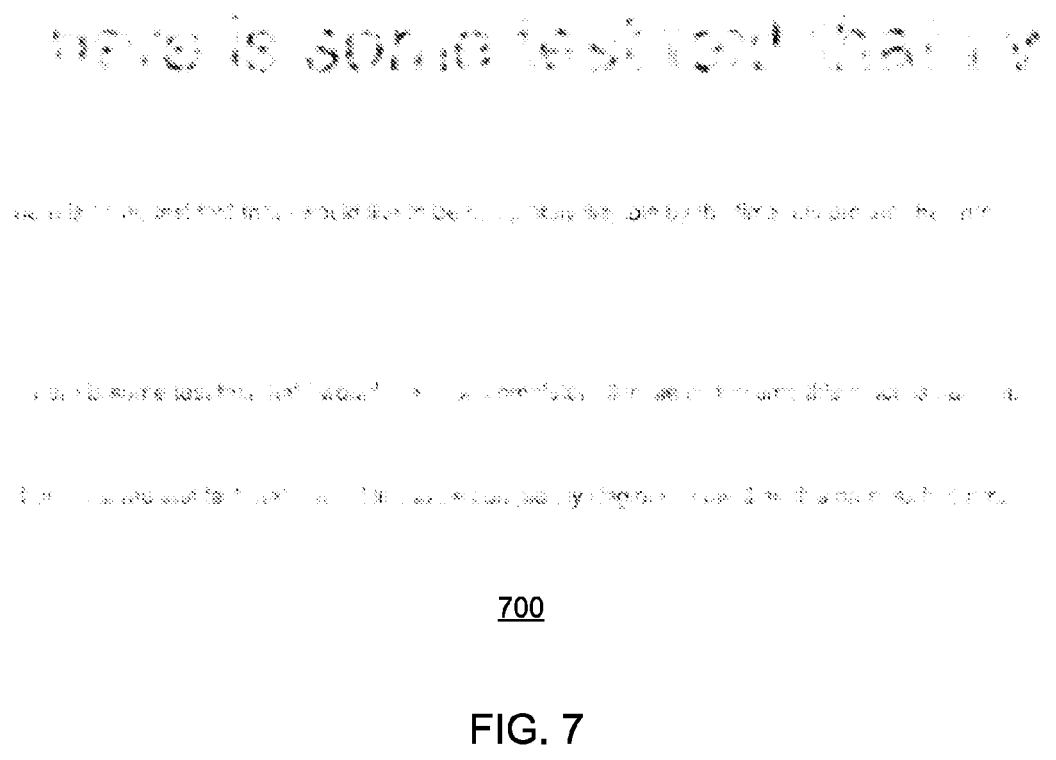

FIG. 7 illustrates another example partial image 700, according to some implementations. As shown, partial image 700 contains a portion of an input image (not shown). Specifically, some visual portions or pixels are shown, and other visual portions are missing. The missing portions or pixels are contained in one or more other partial images (not shown), where the different partial images contain different portions of the input image. In this particular implementation, system 102 distributes groups of four pixels across multiple frames. Adding all of the partial images produces the complete input image.

Example implementations for generating partial images 204 are described in more detail below.

Referring again to FIGS. 2 and 3, in block 306, system 102 displays partial images 204 to a user. As indicated above, the sum of partial images 204 when perceived by the human visual cortex appears to provide the input image 202. In various implementations, when displaying the partial images, system 102 displays the partial images separately and in a sequence. In other words, system 102 displays the partial sequentially one at a time, replacing one partial image with the next partial image, and cycling through all of the partial images. For example, in the display screen of a device (e.g., mobile device, tablet, computer, etc.), system 102 displays partial image 204A for a short time predetermined time period (e.g., 0.5 milliseconds). System 102 then removes partial image 204A from display and subsequently displays partial image 204B for a short time predetermined time period (e.g., 0.5 milliseconds). Note that the subsequent partial image (e.g., partial image 204B) is positioned in the same location on of the display screen as the replaced partial image (e.g., partial image 204A). System 102 then removes partial image 204B from display and subsequently displays partial image 204C for a short time predetermined time period (e.g., 0.5 ms). System 102 then removes partial image 204C from display and subsequently displays partial image 204D for a short time predetermined time period (e.g., 0.5 ms). System 102 then removes partial image 204D from display and subsequently displays partial image 204E for a short time predetermined time period (e.g., 0.5 ms). In other words, system 102 displays only one partial image at a time, but in rapid succession. By viewing all of the partial images in rapid succession, the user perceives the entire input image. After cycling through all of partial images 204A, 204B, 204C, 204D, and 204E, system 102 repeats the cycling process. System 102 repeats the cycling process continuously (without interruption) until halting the overall display of the image.

In various implementations, to display the partial images, system 102 displays the partial images over a predetermined time period (e.g., 25 ms, etc.). The actual length of time that system 102 displays each partial image, as referred to as the refresh rate, (e.g., 1 ms, 2 ms, 5 ms, 10 ms, etc.) or the total length of a cycle (e.g., 5 ms, 10 ms, 25 ms, 50 ms, etc.) will depend on the particular implementations. The length of time of a given cycle may also depend on the number of frames in a given set of partial images.

System 102 displays the sequence of partial images over a short time period and quickly enough such that the user perceives an image in a manner that closely resembles the original input image. In other words, system 102 displays the partial images as a rapid animation in order to produce the input image. In various implementations, the generated partition images are the transmitted media. For example, system 102 may generate and send an animated graphics interchange format (GIF) file.

Implementations described herein have an advantage of persistence of vision. The user's perception of the image is substantially similar whether the user is viewing the original input image (e.g., input image 200 of FIG. 2) or the user is viewing the partial images in rapid succession.

Another advantage is that the user cannot simply take a screen shot of the entire input image. For example, as indicated above, system 102 causes a device to display only one partial image at a time. As such, if the user attempts to take a screen shot, the device will only capture one partial image, assuming the length of time of the capture is less than the rate at which system 102 changes the partial images being displayed. Even if the device were to capture more than one partial image, where the screen shot catches the transition from one partial image to another partial image, the screen shot will still have captured a portion of the input image. As a result, the captured image will be low quality and/or illegible. In other words, information in the form of images such as photos or text may be shared between users in a manner that prevents computer duplication, yet allows for (single time) human consumption without being too disruptive for the viewing user. Furthermore, the entire image can be stored and/or presented to other users.

In various implementations, to increase security, system 102 may divide the image over a greater number of frames (e.g., N=5+ frames). As indicated above, having more frames results in each frame containing less data or information. In some implementations, system 102 may also increase the length of time that each partial image is displayed. In some implementations, system 102 may increase the length of time that each partial image is viewed yet keep length of time small enough so as to prevent the user from perceiving a jitter or flicker as the partial images transition from one partial image to another partial image. In some scenarios, even some jitter may be acceptable, depending on the particular implementation.

In various implementations, system 102 generates the partial images based on a spatial partition or separation of the input image. In various implementations, spatial separation of an image works well for images with a sparse content field (e.g., black text on a white background). This is the approach primarily described above. The spatial separation approach may also be referred to as a one-time-pad approach, where a noise image is effectively a one-time pad for the original input image. With this approach, system 102 ands a one-time pad (e.g., an image of pure noise) with the input image being transmitted. With this approach, as indicated herein, a single frame contains no useable information about the overall image without the corresponding frame. As with the example implementations described above, a set of sparse black/white one-time pad images are generated that when composited together form a complete mask (e.g., for the entire input image).

Referring again to FIG. 2, system 102 generates noise images 206A, 206B, 206C, 206D, and 206E based on various algorithms. In various implementations, system 102 generates partial images 204A, 204B, 204C, 204D, and 204E based in part on noise images 206A, 206B, 206C, 206D, and 206E. As described in more detail below, in various implementations, system 102 generates the partial images based in part on a randomization algorithm. Noise images 206A, 206B, 206C, 206D, and 206E may also be referred to as a set of noise images 206.

The following describes example implementations for generating partial images based on noise images. System 102 determines a security level 212. As indicated above, the security level is proportional to the number N of frames used to partition the input image. As such, in some implementations, the number N of frames may be used to represent the security level.

System 102 then determines blob size 214. In various implementations, the blob size is the size of the groups of pixels in the noise images. System 102 then determines feature size from input image 202. In some implementations, the feature size is determined by a flood fill pixel count (labeled "pixel count" 216 in FIG. 2) for each independent region. System 102 then generates the noise images. This process of generating noise images may also be referred to as blob noise generation, which occurs once for each frame.

In some implementations, system 102 generates a random number 0 through N (e.g., #frameCount) for each pixel in an image and only colors the generated frame's pixel black. The black/white values are then anded with the original image to generate the set of images (with the negative case representing the background color). The composition of these generated partial images forms the original image. As indicated above, no individual frame contains enough information to read the text.

FIGS. 8A to 8E illustrate example noise images 800A, 800B, 800C, 800D, and 800E, according to some implementations. Noise images 800A, 800B, 800C, 800D, and 800E may be used to represent noise images 206A, 206B, 206C, 206D, and 206E of FIG. 2.

In various implementations, the noise images are generated such that when they are "added" together they create a completely dark image. This can be achieved a number of ways, but in this implementation it is using a "one-time pad"

approach where a random number is generated for each pixel and effectively translated into base N where N=number of frames. Then, only the frame that corresponds to that random number has a pixel set for that index. The index is incremented and the process is repeated.

The output images are generated by bitwise-anding the pixels of the input image with the pixels from each noise frame. System 102 only allows the original image to be displayed where the noise frame has the pixel set to black.

Implementations described herein may incorporate various algorithms in order to produce partial images. While various implementations are described herein in the context of spatial separation of an input image, these implementations and other also apply to other approaches such as frequency domain separation of the input image, color domain separation of the input image, etc., or combination thereof. For example, in some implementations, system 102 may generate partial images based on a combination of two or more of spatial separation, frequency domain separation of the image, and color domain separation of the input image.

In various implementations, to generate the partial images, system 102 performs a frequency domain partition of the input image. This approach works well for the more complex cases involving higher information content images (e.g., photos of faces/people). In various implementations, system 102 generates a set of partial images, where each partial image contains a unique range of image frequency components. For example, one or more partial images may show low frequency components. One or more partial images may show medium frequency components. One or more partial images may show high frequency components).

In various implementations, system 102 generates such a partial image set by Fourier transform (FT), or Gaussian blur, etc. The FFT approach has advantages of reducing bleeding and better performance than the Gaussian blur approach, so where practical, it is recommended. With FTs, system 102 may determine the range of the frequency bands dynamically depending upon the frequency composition of the image, to ensure an equipartition of the image across the set of bands.

In some implementations, system 102 may apply saturation balancing to the resultant frequency images. This ensures that the average saturation is the same as the original image, as higher frequency domains typically have darker profiles. When these images are then displayed in quick succession, the original image is discernible, even if a single frame may appear blurred (low frequency) or dominated by edges (high frequency).

Utilizing either partitioning approach, system 102 generates a set of partial images that sufficiently mask the underlying information in a single frame. As indicated herein, upon quick succession, the partial images are "blendable" by the human eye to compose the original image.

Various useful properties of the approaches described herein include the following. In some implementations, system 102 may generate a variable number of frames (the image can be split into any number of composing images). As indicated above, system 102 may adapt to varying refresh rates. In various implementations, the information content for each individual frame is low and probably insufficient to recreate the original input image, which provides security in the sharing of the input image. In various implementations, the motion between subsequent frames is minimal, allowing the human eye to easily composite the images. In various implementations, the averaging of all frames presented provides the original image with little to no distortion. In various implementations, the processing to generate the images is relatively light and easily vectorized for graphic processing unit (GPU) speedups. In various implementations, as indicated above, the more partitions the image is divided into (the more frames), the less information can be gained from any single frame.

Implementations described herein provide various benefits. For example, implementations described herein provide secure digital images. Such digital images are secure in that they are uncopiable.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

While system 102 is described as performing the steps as described in the implementations herein, any suitable component or combination of components of system 102 or any suitable processor or processors associated with system 102 may perform the steps described.

Figure 9:
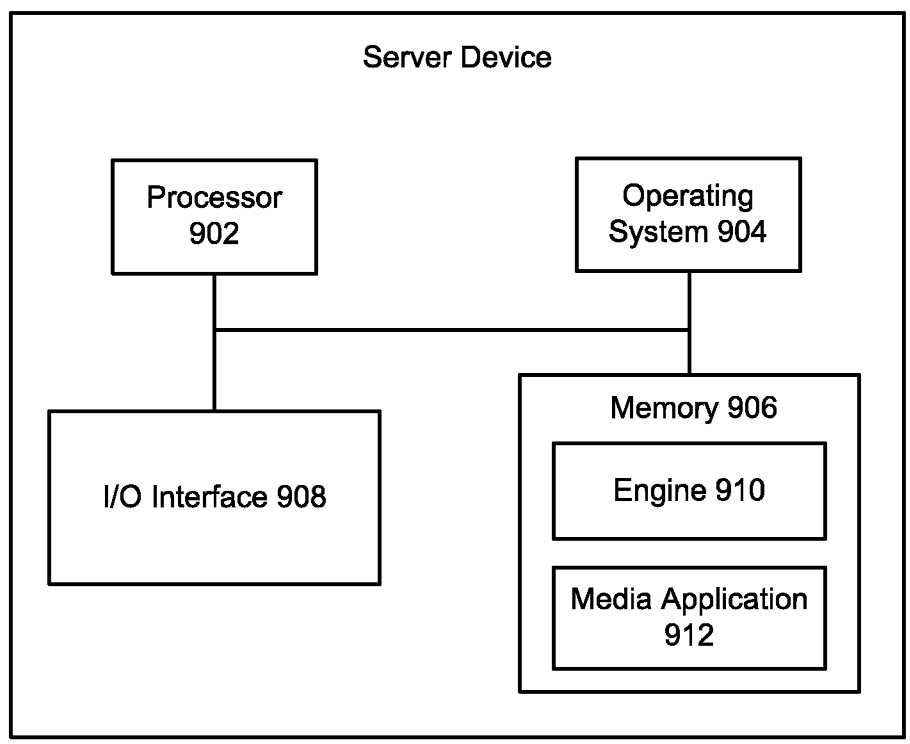
FIG. 9 illustrates a block diagram of an example server device, which may be used to implement the implementations described herein.

FIG. 9 illustrates a block diagram of an example server device 900, which may be used to implement the implementations described herein. For example, server device 900 may be used to implement server device 104 of FIG. 1, as well as to perform the method implementations described herein. In some implementations, server device 900 includes a processor 902, an operating system 904, a memory 906, and an input/output (I/O) interface 908. Server device 900 also includes a network engine 910 and a media application 912, which may be stored in memory 906 or on any other suitable storage location or computer-readable medium. Media application 912 provides instructions that enable processor 902 to perform the functions described herein and other functions.

For ease of illustration, FIG. 9 shows one block for each of processor 902, operating system 904, memory 906, I/O interface 908, engine 910, and media application 912. These blocks 902, 904, 906, 908, 910, and 912 may represent multiple processors, operating systems, memories, I/O interfaces, engines, and media applications. In other implementations, server device 900 may not have all of the components shown and/or may have other elements including other types of elements instead of, or in addition to, those shown herein.

Although the description has been described with respect to particular embodiments thereof, these particular embodiments are merely illustrative, and not restrictive. Concepts illustrated in the examples may be applied to other examples and implementations. For example, some implementations are described herein in the context of a social network system. However, the implementations described herein may apply in contexts other than a social network. For example, implementations may apply locally for an individual user.

Note that the functional blocks, methods, devices, and systems described in the present disclosure may be integrated or divided into different combinations of systems, devices, and functional blocks as would be known to those skilled in the art.

Any suitable programming languages and programming techniques may be used to implement the routines of particular embodiments. Different programming techniques may be employed such as procedural or object-oriented. The routines may execute on a single processing device or multiple processors. Although the steps, operations, or computations may be presented in a specific order, the order may be changed in different particular embodiments. In some particular embodiments, multiple steps shown as sequential in this specification may be performed at the same time.

A "processor" includes any suitable hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable data storage, memory and/or non-transitory computer-readable storage medium, including electronic storage devices such as random-access memory (RAM), read-only memory (ROM), magnetic storage device (hard disk drive or the like), flash, optical storage device (CD, DVD or the like), magnetic or optical disk, or other tangible media suitable for storing instructions (e.g., program or software instructions) for execution by the processor. For example, a tangible medium such as a hardware storage device can be used to store the control logic, which can include executable instructions. The instructions can also be contained in, and provided as, an electronic signal, for example in the form of software as a service (SaaS) delivered from a server (e.g., a distributed system and/or a cloud computing system).

What is claimed is:

1. A computer-implemented method comprising:
- receiving an input image;
- generating a plurality of partial images derived from the input image, wherein generating the plurality of partial images comprises:
  - generating a plurality of noise images; and
  - performing a logical AND operation between the input image and each of the plurality of noise images to generate a corresponding partial image of the plurality of partial images; and
- displaying the plurality of partial images to a user, wherein a sum of the partial images provides the input image.

2. The method of claim 1, wherein the generating of the plurality of images is based in part on a randomization algorithm.

3. The method of claim 1, wherein the generating of the plurality of images is based in part on a plurality of noise images.

4. The method of claim 1, wherein the generating of the plurality of partial images is based on a spatial separation of the input image.

5. The method of claim 1, wherein the generating of the plurality of partial images comprises performing a frequency domain partition of the input image.

6. The method of claim 1, wherein the displaying of the plurality of partial images comprises displaying the partial images sequentially.

7. The computer-implemented method of claim 6, wherein displaying the partial images sequentially comprises replacing a first partial image of the plurality of partial images with a next partial image of the plurality of partial images such that the first partial image and the next partial image are positioned at a same location on a display screen.

8. The method of claim 1, wherein the displaying of the plurality of partial images comprises displaying the partial images over a predetermined time period.

9. The computer-implemented method of claim 1, wherein at least one visual portion of the input image is missing from each of the plurality of partial images.

10. The computer-implemented method of claim 1, wherein each partial image includes a respective portion of the input image and wherein the original input image cannot be derived from any one partial image.

11. The computer-implemented method of claim 1, wherein generating the plurality of partial images comprises:
- determining a feature size from the input image;
- determining a blob size based on the feature size and a security level; and
- generating a plurality of noise images, wherein a size of groups of pixels in each of plurality of noise images is the blob size.

12. The computer-implemented method of claim 11, wherein determining the feature size comprises determining a flood fill pixel count for each independent region of the input image.

13. A non-transitory computer-readable storage medium carrying program instructions thereon, the instructions when executed by one or more processors cause the one or more processors to perform operations comprising:
- receiving an input image;
- generating a plurality of partial images derived from the input image, wherein the generating comprises:
  - generating a plurality of noise images; and
  - performing a logical AND operation between the input image and each of the plurality of noise images to generate a corresponding partial image of the plurality of partial images; and
- sequentially displaying the plurality of partial images to a user, wherein a sum of the partial images provides visual perception of the input image.

14. The computer-readable medium of claim 13, wherein the generating of the plurality of images is based in part on a randomization algorithm.

15. The computer-readable medium of claim 13, wherein the generating of the plurality of images is based in part on a plurality of noise images.

16. The computer-readable medium of claim 13, wherein the instructions further cause the one or more processors to perform operations comprising generating the plurality of partial images based on a spatial separation of the input image.

17. The computer-readable medium of claim 13, wherein, to generate the plurality of partial images, the instructions further cause the one or more processors to perform operations comprising performing a frequency domain partition of the input image.

18. The computer-readable medium of claim 13, wherein, to display the plurality of partial images, the instructions further cause the one or more processors to perform operations comprising displaying the partial images sequentially over a predetermined time period.

19. A system comprising:
- one or more processors; and
- logic encoded in one or more tangible media for execution by the one or more processors and when executed operable to perform operations comprising:
  - receiving an input image;

generating a plurality of partial images derived from the input image, wherein the generating comprises:
determining a feature size from the input image,
determining a blob size based on the feature size and a security level; and
generating a plurality of noise images, wherein a size of groups of pixels in each of plurality of noise images is the blob size; and
sequentially displaying the plurality of partial images to a user, wherein a sum of the partial images provides perception of the input image to a human eye.

* * * * *